US00RE41984E

(19) United States
(12) Reissued Patent
Kitagawa

(10) Patent Number: US RE41,984 E
(45) Date of Reissued Patent: Dec. 7, 2010

(54) STILL-PICTURE ACQUISITION METHOD AND APPARATUS APPLIED TO MICROSCOPE

(75) Inventor: Hisao Kitagawa, Kunitachi (JP)

(73) Assignee: Olympus Corporation, Tokyo (JP)

(21) Appl. No.: 10/962,258

(22) Filed: Oct. 8, 2004

Related U.S. Patent Documents

Reissue of:
(64) Patent No.: 6,462,771
Issued: Oct. 8, 2002
Appl. No.: 09/532,066
Filed: Mar. 21, 2000

(30) Foreign Application Priority Data

Mar. 24, 1999 (JP) ..... 11-080027

(51) Int. Cl.
*H04N 7/18* (2006.01)

(52) U.S. Cl. ..... 348/79; 348/74; 348/E7.085
(58) Field of Classification Search ..... 348/79
See application file for complete search history.

(56) References Cited

U.S. PATENT DOCUMENTS 4,972,258 A * 11/1990 Wolf et al. ..... 348/79
5,012,100 A * 4/1991 Plies et al. ..... 250/342
5,091,652 A * 2/1992 Mathies et al. ..... 250/458.1
5,283,433 A 2/1994 Tsien
6,157,408 A * 12/2000 Etoh ..... 348/316
6,218,132 B1 * 4/2001 Spack et al. ..... 435/7.24
RE39,751 E * 7/2007 Kitagawa ..... 359/385

FOREIGN PATENT DOCUMENTS

JP 5-219937 8/1993
JP 6-201999 A 7/1994
JP 10-10436 1/1998
JP 11-55563 A 2/1999

OTHER PUBLICATIONS

Japanese Office Action dated Jun. 16, 2009 (2 pages), and English translation thereof (2 pages), issued in counterpart Japanese Appliation Serial No. 11–080027.

* cited by examiner

*Primary Examiner*—Nhon T Diep
(74) *Attorney, Agent, or Firm*—Holtz, Holtz, Goodman & Chick, PC

(57) ABSTRACT

A still-picture acquisition section in a computer selects a brightness-periodically-varying portion of image data of a living cell like a cardiac cell, as a sample, which makes a self-ordered periodic motion, monitors a change in brightness, generates a trigger signal at the timing at which the value of the brightness exceeds a specific threshold value, causes a camera body to repeatedly pick up the image of the living cell after a predetermined delay time, and then averages the picked-up images. This makes it possible to acquire as high-quality still pictures the instantaneous status of a living cell which varies with time in accordance with the application of external stimulation or the in-vivo order.

24 Claims, 9 Drawing Sheets

STILL-PICTURE ACQUISITION METHOD AND APPARATUS APPLIED TO MICROSCOPE

Matter enclosed in heavy brackets [ ] appears in the original patent but forms no part of this reissue specification; matter printed in italics indicates the additions made by reissue.

CROSS-REFERENCE TO RELATED APPLICATIONS

This application is based upon and claims the benefit of priority from the prior Japanese Patent Application No. 11-080027, filed Mar. 24, 1999, the entire contents of which are incorporated herein by reference.

BACKGROUND OF THE INVENTION

The present invention relates to a still-picture acquisition method and apparatus applied to a microscope and, more particularly, to a still-picture acquisition method and apparatus applied to a microscope, which are used in observing the biodynamics of a sample such as a living cell by using a fluorescence probe, and pick up images of a living cell or the like that shows a dynamic behavior and acquire its still picture.

Recently have been made attempts to visualize the ion concentration, film potential and so forth by means of a fluorescence probe using optical microscopes. For instance, the biodynamics of samples such as a neurocyte, particularly, the biodynamic behaviors thereof, are observed.

While such observation of a neurocyte or the like is intended to observe the dynamic behavior of a cell, it is effective to photograph one process of the dynamic behavior to clearly record the process as a still picture.

Catching one process of the dynamic behavior of a neurocyte or the like, however, requires the time resolution of a millisecond order so that the exposure time in photographing such a process becomes shorter to approximately a millisecond.

According to the conventional still-picture acquisition apparatus for the microscope that uses a photosensitive material such as a silver film, therefore, the photosensitive material suffers an insufficient sensitivity. Further, as the sensitivity is increased, the graininess becomes degraded. It has therefore been impossible to photograph a fluorescence-marked cell under a fluorescence microscope in such short exposure.

An apparatus and method which observe the dynamic behavior of an organic sample using a solid-state image pickup device or an optical scan type microscope are disclosed in, for example, Jpn. Pat. Appln. KOKAI Publication No. 5-219937. This publication describes an organic sample observing system using a solid-state image pickup device. This system is aims at making an observation over a long period of time to track the growth and proliferation of an organic sample and carries out so-called "intermittent photographing" to track the growth and proliferation of an organic sample over a time span of the order of several hours to several tens of hours while acquiring images at given time intervals. That is, the exposure and photographing timings are not determined by the dynamic behavior of a cell sample but merely take place at preset time intervals. This prior art is therefore inadequate for use in recording the images of the dynamic behavior of a living cell, such as a neurocyte, that varies at a high speed.

Jpn. Pat. Appln. KOKAI Publication No. 10-10436 discloses means which observes the physiological phenomenon of a cell immediately before and after application of a trigger signal using an optical scan type microscope. The disclosed technique stimulates a sample by means of a trigger signal which is obtained by detecting light from the sample and acquires the image of the sample immediately after the stimulation.

Because this prior art system acquires only the (one) image of a sample immediately after (or immediately before) stimulating the sample, however, the amount of fluorescence photons that can be sensed per pixel in a short time (about a millisecond) during which an image is acquired is reduced to the order of several to several tens of photons particularly in an application of measuring a fast phenomenon. Even if the specifications and performance of an electric circuit, such as the light-receiving sensitivity and SN ratio of a fluorescence sensor or probe, are adequate, therefore, it is inevitable from the viewpoint of the quantum physics that random noise caused by the quantum noise that is determined by the square root of the number of photons is superimposed on an acquired image, thereby degrading the image quality. While this prior art provides means for observing the dynamic behavior of a cell using an optical scan type microscope, it has no countermeasure against the degrading of the image quality caused by the quantum noise that increases as the sensing speed increases. The prior art system is therefore inadequate for usage in showing the dynamic behavior of a fast-varying living cell, such as a neurocyte, as high-quality still pictures.

A rotary disk scanner which simultaneously scans with multiple light beams is more suitable for fast image pickup to observe the dynamic behavior of a neurocyte than the scanner that scans with a single light beam as described in the Jpn. Pat. Appln. KOKAI Publication No. 10-10436.

A system which uses the rotary disk scanner that simultaneously scans with multiple light beams should synchronize the exposure time for photographing with the disk rotation at the time of picking up a high-quality still picture using the rotary disk scanner, but assumes no synchronization with the behavior of the cell sample. This system is therefore inadequate for usage in recording the dynamic behavior of a living cell, such as a neurocyte, as high-quality still pictures.

None of the prior art techniques cannot acquire the dynamic behavior of a fast-varying living cell, such as a neurocyte, as high-quality still pictures.

BRIEF SUMMARY OF THE INVENTION

Accordingly, it is an object of the present invention to provide a still-picture acquisition method and apparatus applied to a microscope, which can acquire as high-quality still pictures the instantaneous status of a living cell which varies with time in accordance with the application of external stimulation or the in-vivo order.

According to one aspect of the present invention, there is provided a still-picture acquisition apparatus for a microscope, comprising: means for repeatedly picking up an image of a sample at a timing based on a dynamic behavior of the sample; and means for acquiring a still picture by accumulating or averaging picked-up images.

The apparatus may further comprise means for detecting a periodic change in brightness of the sample and determining the image-pickup timing in synchronism with the change in brightness. In this case, the determining means may set the image-pickup timing to a point of a predetermined delay time from a timing at which a value of the brightness exceeds a specific threshold value.

The apparatus may further comprise means for determining the image-pickup timing in synchronism with an electric signal to be detected in accordance with the dynamic behavior of the sample. In this case, the determining means may set the image-pickup timing to a point of a predetermined delay time from a timing at which a value of the electric signal exceeds a specific threshold value.

The apparatus may further comprise means for determining the image-pickup timing in synchronism with a timing at which the sample is stimulated. In this case, the determining means may set the image-pickup timing to a point of a predetermined delay time from a timing at which the sample is stimulated. The apparatus may further comprise means for stimulating the sample by a chemical, means for stimulating the sample by light, or means for stimulating the sample by electricity.

The apparatus may further comprise: a scanner for scanning the sample with a laser beam; and means for controlling the scanner in accordance with the timing based on the dynamic behavior of the sample.

According to another aspect of the present invention, there is provided a still-picture acquisition apparatus for a microscope, comprising: an image pickup device for accumulating images of a sample in synchronism with an electric signal to be detected in accordance with a dynamic behavior of the sample; and means for transferring a still picture formed by accumulation of the images of the sample in the image pickup device.

According to still another aspect of the present invention, there is provided a still-picture acquisition method applied to a microscope, comprising the steps of: repeatedly picking up an image of a sample at a timing based on a dynamic behavior of the sample; and acquiring a still picture by accumulating or averaging picked-up images.

According to still another aspect of the present invention, there is provided a computer-readable storage medium having computer program components stored thereon that perform acquiring a still picture, the program components comprising: means for causing a computer to perform control to repeatedly pick up an image of a sample at a timing based on a dynamic behavior of the sample; and means for causing a computer to acquire a still picture by accumulating or averaging picked-up images.

According to still another aspect of the present invention, there is provided a computer program data signal embodied in a data stream comprising program components that perform acquiring a still picture, the program components comprising: means for causing a computer to perform control to repeatedly pick up an image of a sample at a timing based on a dynamic behavior of the sample; and means for causing a computer to acquire a still picture by accumulating or averaging picked-up images.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which.

DETAILED DESCRIPTION OF THE INVENTION

Preferred embodiments of the present invention will be described below with reference to the accompanying drawings.

First Embodiment

The first embodiment of the present invention will now be described referring to the accompanying drawings.

Figure 1:
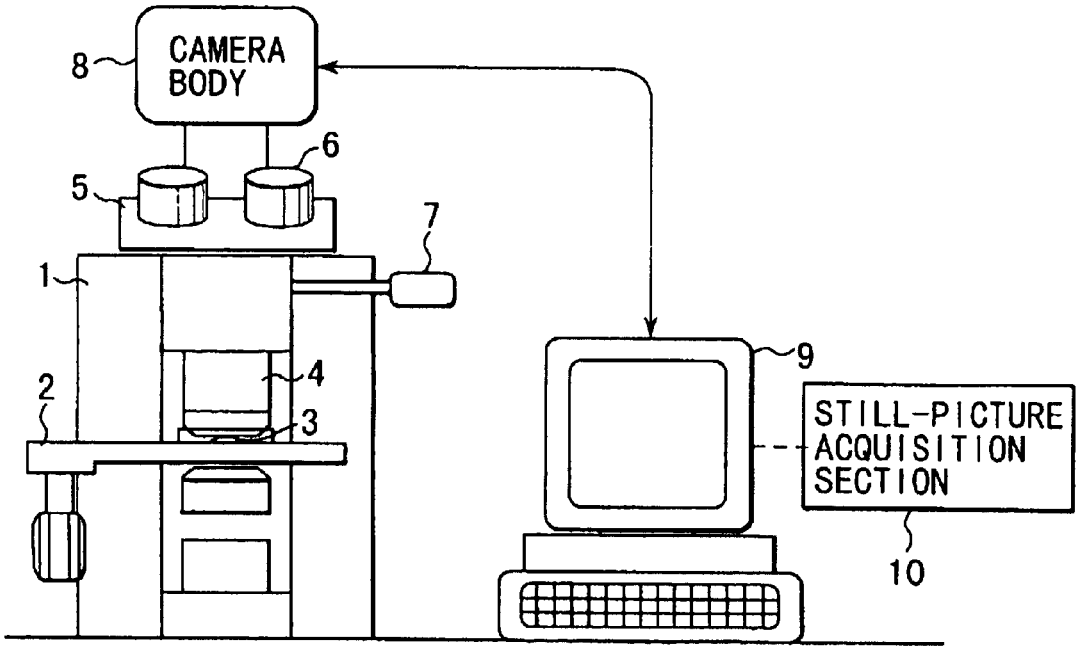
FIG. 1 is a structural diagram illustrating a still-picture acquisition apparatus according to a first embodiment of the present invention.
Figure 2:
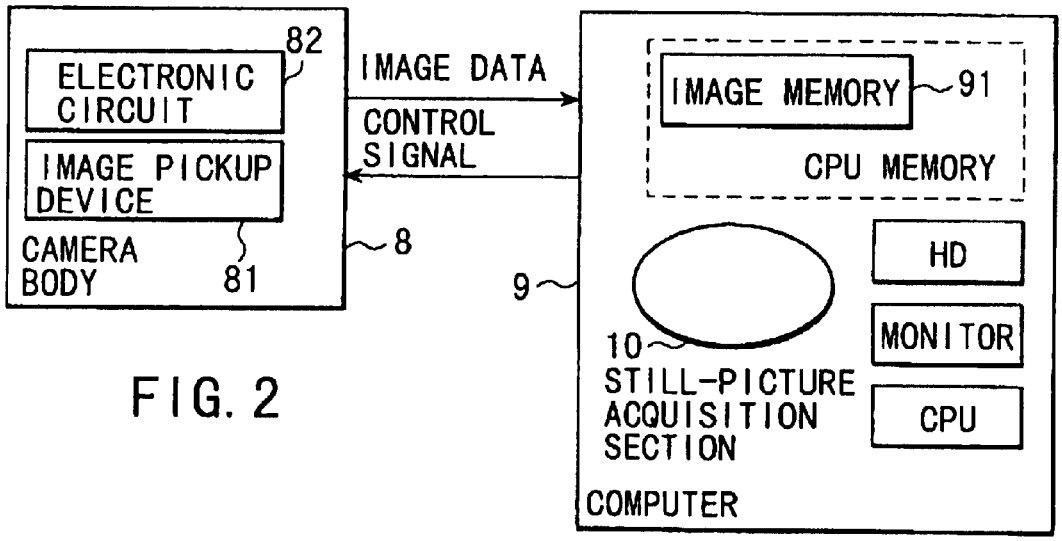
FIG. 2 is a diagram showing the relationship between a computer and a camera body in this apparatus.

FIG. 1 is a structural diagram illustrating a still-picture acquisition apparatus. FIG. 2 shows the relationship between a computer and a camera body in this apparatus.

A sample 3 is placed on a stage 2 of a microscope body 1.

This sample 3 is a living cell and is dipped in a culture solution in an incubator such as a Petri dish. The sample 3 keeps its life under the life-sustaining environments such as the temperature and PH that are maintained by connecting a heat retaining apparatus, a $CO_2$ perfusion apparatus or the like to the incubator.

An objective lens 4 mounted on the microscope body 1 is an immersion objective lens which is dipped in the culture solution in the incubator where the sample 3 is to be placed. An image acquired by this objective lens 4 can be visually observed through ocular lenses or eyepieces 6 of a binocular observing section located at the front side of a tri-ophthal lens barrel 5.

An optical-path switching lever 7, when manipulated, switches the optical path to a cylindrical portion located above the tri-ophthal lens barrel 5 to thereby guide the image of the sample 3 to a camera body 8 which incorporates a solid-state image pickup device 81. Therefore, the camera body 8 can photograph an enlarged image of the sample 3.

The microscope body 1 incorporates a transmission illuminator and a direct illumination fluorescence device as illuminators and can carry out both transmitted-light observation and fluorescent observation of the sample 3.

In addition to the solid-state image pickup device 81, the camera body 8 incorporates an electronic circuit 82 which has a capability of exchange control signals with a computer 9 and a capability of transferring image data, picked up by the solid-state image pickup device 81, to the computer 9. While this camera body 8 may use a general-purpose communication port or SCSI adapter, such as a serial connection type (RS-232C), to connect to the computer 9, it should preferably use a system which connects an exclusive I/O port to the PCI expansion slot of the computer 9 and performs DMA transfer of image data to the CPU memory via a buffer memory on the I/O port for the usage in observation of fast dynamic behaviors to which the present invention is directed.

The computer 9 has a capability of quickly reading images and tracking the dynamic behavior of a cell in the image observation done by the solid-state image pickup device 81 of the camera body 8. AS the number of photons that can be sensed per pixel in a short time decreases in this process, random noise becomes noticeable particularly in the darkfield portion in the image. To cope with this shortcoming, the software (computer program) for this computer 9 is so designed as to allow a user to pre-select and designated a bright portion in the image while checking the image on the monitor of the computer 9.

The computer 9 has the function of a still-picture acquisition section 10 which detects a periodic change in brightness of the sample 3, determines the timing based on the dynamic behavior of the sample 3, i.e., the timing of fetching the image of the sample 3 in synchronism with this change in brightness, repeatedly fetches the image of the sample 3 at this timing, and acquires a still picture by accumulating (adding) or averaging those picked-up images.

Figure 3:
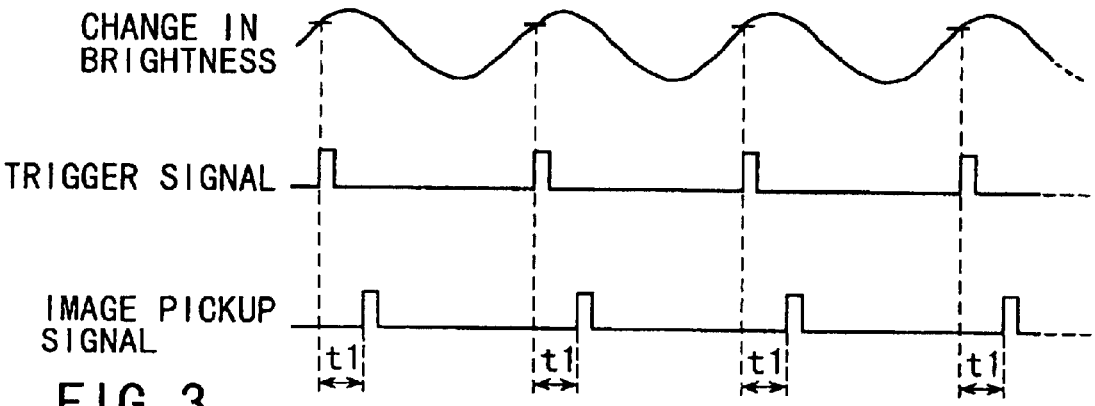
FIG. 3 is a timing chart for explaining signal processing in this apparatus.

Specifically, the computer 9 runs the software to continuously read a change in brightness (image data value) of an area selected by the solid-state image pickup device, generates an internal trigger signal (including a software-oriented signal, such as alteration of parameters in the computer) when the value of the brightness exceeds a specific threshold value, and generates and sends a control signal (such as an image pickup signal indicating image sensing) to the camera body 8 so that an image is fetched after a predetermined time t1 set by the user (see the timing chart in FIG. 3).

The software that carries out the above processing may be stored on a computer-readable storage medium (e.g., a floppy disk, a CD-ROM, a DVD, and a memory card), and may be so implemented as to be loaded and run by a computer, as needed.

This camera body 8 photographs the sample 3 upon reception of a control signal from the computer 9 and transfers image data to the computer 9.

The computer 9 has a capability of temporarily saving the transferred image data in an image memory 91 secured on the CPU memory and overwriting the saved image data while averaging the saved image data and subsequently written image data.

As the image memory 91 is secured on the CPU memory, the CPU can easily access the image memory 91 and overwrite data therein in accordance with a software-oriented instruction.

The operation of the thus constructed apparatus will now be discussed.

The sample 3 which is a living cell whose living environment is maintained on the microscope body 1 is visually observed through the objective lens 4 and eyepieces 6 using transmitted light or fluorescent light. Through this visual observation, the positioning of the sample 3 and focusing thereon and brightness adjustment are carried out.

When the optical path is switched to the camera body side by manipulating the optical-path switching lever 7, the image of the sample 3 is formed on the pickup surface of the solid-state image pickup device in the camera body 8. The camera body 8 picks up the image of the sample 3 and transfers the image data to the computer 9. The computer 9 fetches the image data from the camera body 8 and displays the image of the sample 3 on the monitor screen. Accordingly, the user confirms the image on the monitor of the computer 9 or saves the image data into the CPU memory or hard disk.

In the image observation by the solid-state image pickup device under the control of the computer 9, it is possible to read out images of a cell at a high speed and track the dynamic behavior of the cell. At this time, as mentioned earlier, the number of photons that can be acquired per pixel in a short time decreases, random noise becomes noticeable particularly in the darkfield portion in the image.

According to this embodiment, therefore, in fluorescence observation of a cardio cell in which a Ca fluorescent indicator such as fluo-3 has been injected, the user confirms the portion that shows a noticeable change in fluorescence intensity with the time in accordance with the cardio pulsation on the monitor screen of the computer 9 and selects the desired portion of the image.

The still-picture acquisition section 10 in the computer 9 monitors the cardio pulsation by continuously reading a change in the brightness (image data value) of the selected area from the image data of the sample 3.

Further, the still-picture acquisition section 10 generates an internal trigger signal (software-oriented signal, such as alteration of parameters in the computer) when the value of the brightness exceeds a specific threshold value, and sends a control signal to the camera body 8 so as to fetch the image of the sample 3 after a predetermined time t1 set by the user.

Accordingly, the camera body 8 repeatedly picks up the image of the sample 3 only at the specific timing in a periodic change in the cardio pulsation upon reception of the control signal from the computer 9.

The individual images picked up at such a timing are saved as image data in the image memory secured on the CPU memory and are overwritten while averaging the saved image data and the images that are picked up and subsequently written in the next cycle. Therefore, data on the image memory is averaged for each period of the cardio pulsation. Repeating such a periodic process averages the random noise so that it will disappear.

Figure 4:
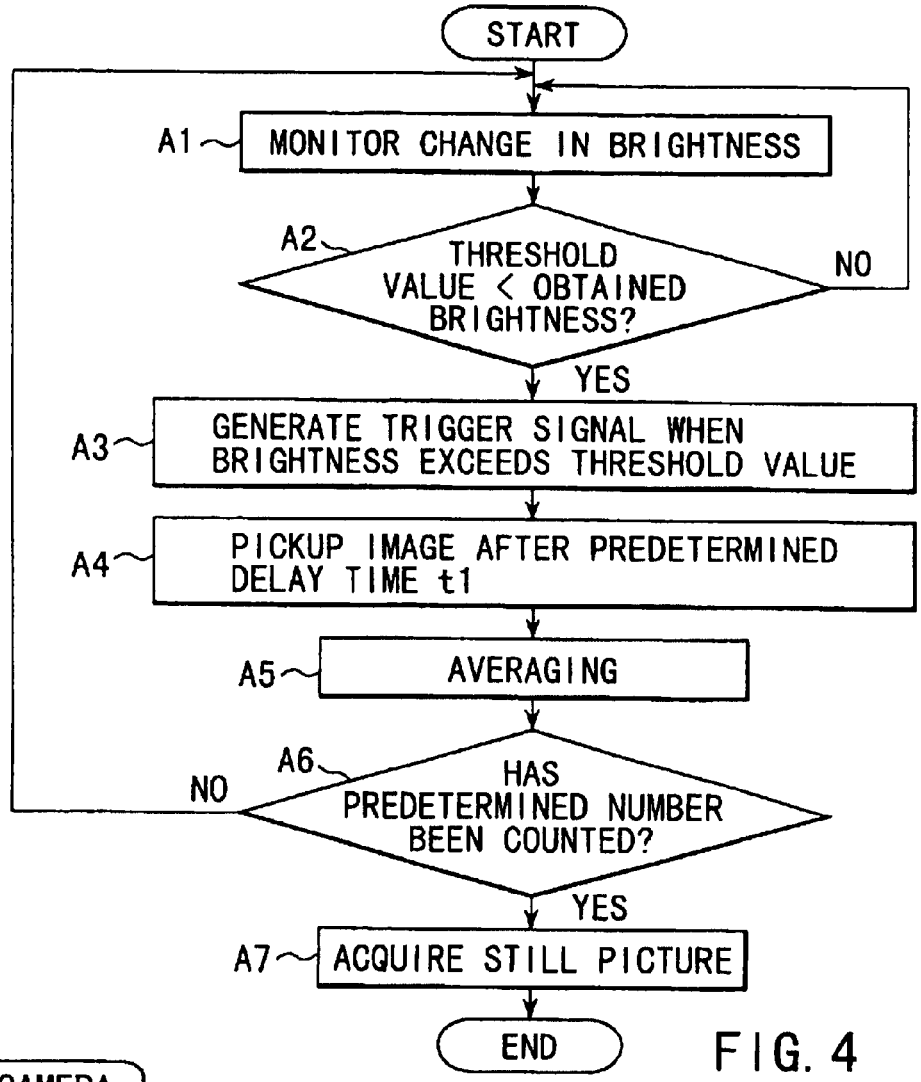
FIG. 4 is a flowchart for explaining the operation of this apparatus.

Next, the operation of this embodiment will be described by reference to FIG. 4.

In a living cell, as the sample 3, which shows the self-retained periodic movement, such as a cardio cell, the portion whose brightness periodically changes in image data is selected and a change in that brightness is monitored (step A1). The trigger signal is generated at the timing when the brightness exceeds a specific threshold value (steps A2, A3), the camera body 8 picks up the image at a predetermined delay time t1 (step A4) and averaging, for example, is performed (step A5).

It is to be noted that a counter for counting a number of execution of a procedure corresponding to a series of steps A1 to A5, is provided in the computer in advance, and a value on the counter is automatically incremented by one every when the process is executed.

It is determined whether or not a number of execution of the procedure has reached a predetermined number, based on the value of the counter (step A6). If no, the procedure is repeatedly executed. If yes, a still-picture, which is produced from the averaging, is acquired (step A7).

This makes it possible to acquire as high-quality still pictures the spontaneous states of a living cell, such as a cardio cell, as the sample 3 which varies with time in accordance with the in-vivo order.

The first embodiment has been described with reference to the case where a change in the brightness of the image of a living cell itself to be observed and sensed is monitored. But, organic cells in a cardio cell work together and pulsate so that the area whose brightness change is to be monitored need not be the same as the living cell that is to be observed and sensed. That is, the same advantages as obtained by the first embodiment can be acquired even if a change in the brightness of an ambient area, such as an adjoining cell is monitored.

Second Embodiment

The second embodiment of the present invention will now be described. To avoid the redundant description, like or same reference numerals are given to those components which are the same as the corresponding components of the first embodiment.

Figure 5:
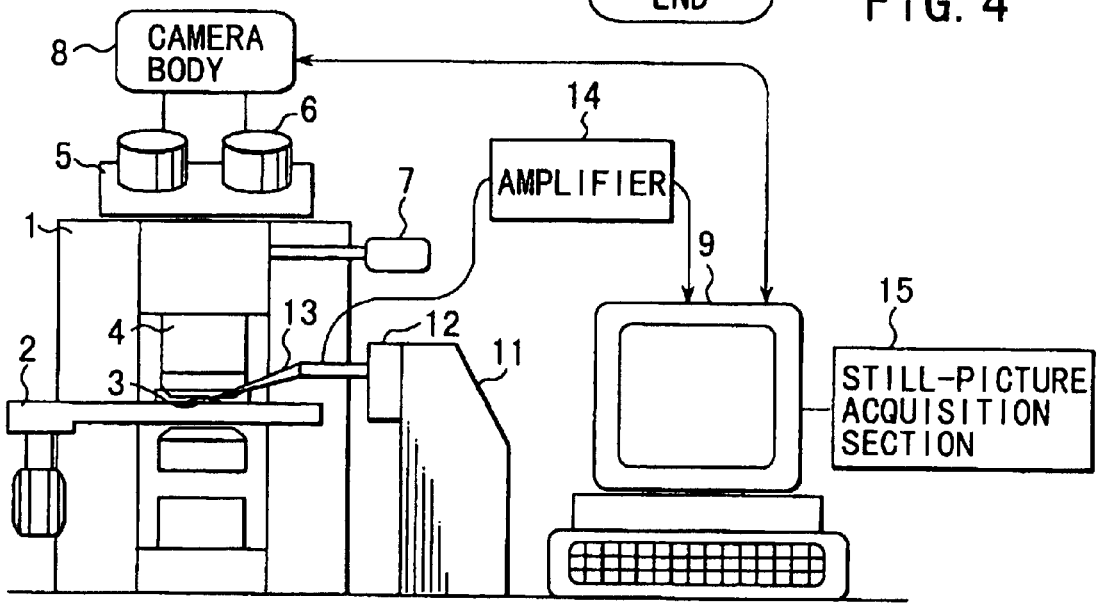
FIG. 5 is a structural diagram illustrating a still-picture acquisition apparatus according to a second embodiment of the present invention.

FIG. 5 is a structural diagram of a still-picture acquisition apparatus.

A support platform 11 is located on the right-hand side to the microscope body 1 and a micro-manipulator 12 having a driving mechanism is provided on this support platform 11. This micro-manipulator 12 has a cell electrode 13 attached to the distal end. The cell electrode 13 is a probe which is transfixed into a neurocyte as the sample 3 and detects a cellular physiological electric signal which varies in accordance with the transmission of excitation of the sample 3. The cell electrode 13 has a capability of detecting a pulse-like signal in accordance with the movement of a neurocyte. The cell electrode 13 is connected to the I/O port of the computer 9 via an amplifier 14.

The computer 9 has the function of a still-picture acquisition section 15 which determines the timing based on the dynamic behavior of the sample 3, i.e., the timing of fetching the image of the sample 3 in synchronism with the electric signal from the cell electrode 13 that is detected according to the dynamic behavior of the sample 3, repeatedly fetches the image of the sample 3 at this timing, and acquires a still picture by accumulating or averaging those picked-up images.

The operation of the thus constructed apparatus will now be discussed.

The sample 3 is a small experimental animal, a living organ or a living cell, for example, and the dynamic behavior of its neurocyte is to be observed here.

The cell electrode 13 is transfixed in the neurocyte as the sample 3 by manipulating the micro-manipulator 12 and detects a cellular physiological pulse-like electric signal which varies in accordance with the transmission of excitation of the sample 3. The electric signal detected by the cell electrode 13 is amplified by the amplifier 14 and then sent to the computer 9.

The computer 9 performs signal processing on the electric signal received from the cell electrode 13 to monitor the status of the sample 3. As a result, the behavior of the sample 3 is detected.

The camera body 8 picks up the image of the sample 3 and transfers the image data to the computer 9. The computer 9 fetches the image data from the camera body 8 and displays the image of the sample 3 on the monitor screen.

At this time, the still-picture acquisition section 15 of the computer 9 receives the electric signal from the cell electrode 13 that is detected in accordance with the dynamic behavior of the sample 3, determines the timing of fetching the image of the sample 3 in synchronism with this electric signal and accumulates or averages data of those images, thereby yielding a still picture.

Figure 6:
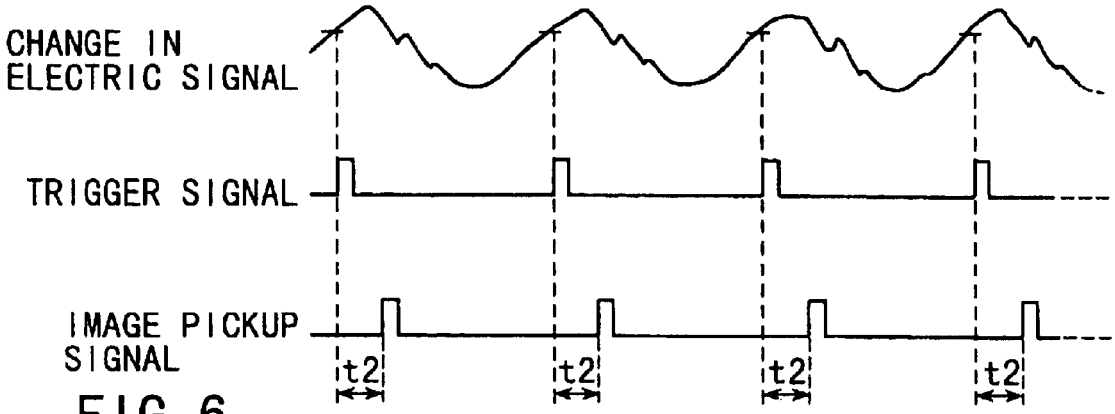
FIG. 6 is a timing chart for explaining signal processing in this apparatus.

That is, the still-picture acquisition section 15 of the computer 9 generates an internal trigger signal (software-oriented signal, such as alteration of parameters in the computer) when the electric signal from the cell electrode 13 exceeds a specific threshold value, and sends a control signal (an image pickup signal indicating image sensing) to the camera body 8 so as to fetch the image of the sample 3 after a predetermined time t2 set by the user (see the timing chart in FIG. 6).

Accordingly, upon reception of the control signal from the computer 9, the camera body 8 picks up the image of the sample 3 only at the specific timing immediately after the behavior of the sample 3 occurs.

The still-picture acquisition section 15 of the computer 9 repeats applying such stimulation to the sample 3 as to cause the transmission of excitation, fetches the image of the sample 3 at that timing, and overwrites the image data while accumulating or averaging those images, thereby yielding a still picture, as per the first embodiment.

According to the second embodiment, as discussed above, the timing based on the dynamic behavior of the sample 3, i.e., the timing of fetching the image of the sample 3 in synchronism with the electric signal from the cell electrode 13 that is detected in accordance with the dynamic behavior of the sample 3 is determined, the image of the sample 3 is repeatedly fetched at this timing, and data of those images is accumulated or averaged to acquire a still picture.

Figure 7:
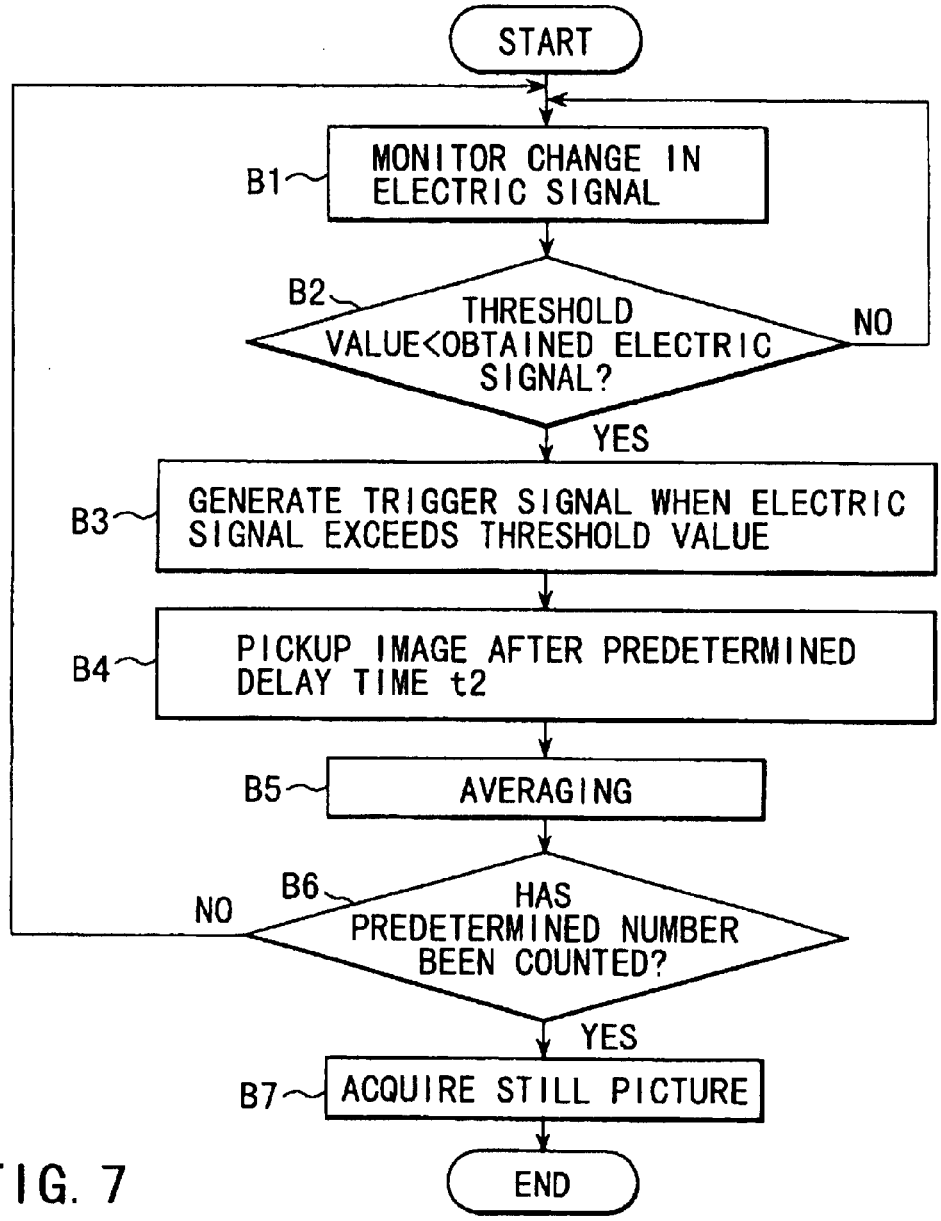
FIG. 7 is a flowchart for explaining the operation of this apparatus.

Next, the operation of this embodiment will be described by reference to FIG. 7.

Under the observation conditions in which the sample 3 demonstrates a pulsative dynamic behavior such as transmission of excitation, a change in the cellular physiological electric signal of the sample 3 is monitored by using the cell electrode 13 (step B1), the trigger signal is generated at the timing when the brightness exceeds a specific threshold value (steps B2, B3), the camera body 8 picks up the image at a predetermined delay time t2 (step B4) and averaging, for example, is performed (step B5).

It is to be noted that a counter for counting a number of execution of a procedure corresponding to a series of steps B1 to B5, is provided in the computer in advance, and a value on the counter is automatically incremented by one every when the process is executed.

It is determined whether or not a number of execution of the procedure has reached a predetermined number, based on the value of the counter (step B6). If no, the procedure is repeatedly executed. If yes, a still-picture, which is produced from the averaging, is acquired (step B7).

This makes it possible to acquire high-quality still pictures at a specific timing in the process of transmitting excitation.

Although the second embodiment has been described with reference to the case where the cell electrode 13 is transfixed in the sample 3, the present invention is not limited to this particular type but is adaptable even if the structure of the cell electrode 13 is changed to a type which is put close contact to a cell as in the patch clamp method or the like or to a type which has an electrode incorporated in the incubator.

Modification of Second Embodiment

A modification of the second embodiment of the present invention will now be discussed. To avoid the redundant description, like or same reference numerals are given to those components which are the same as the corresponding components in FIG. 5.

Figure 8:
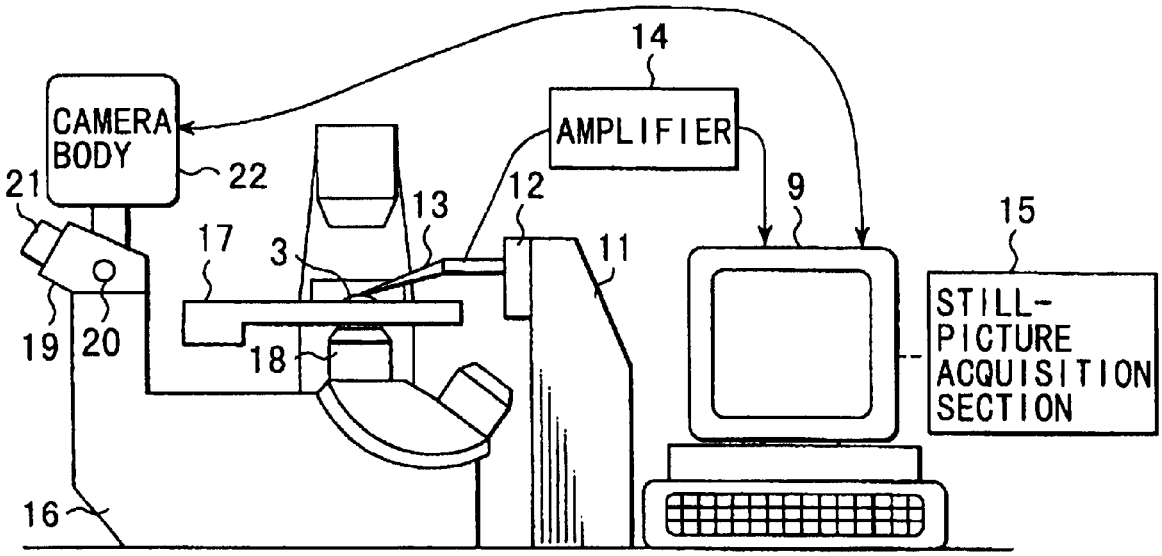
FIG. 8 is a perspective structural diagram illustrating a modification of the second embodiment.

FIG. 8 is a perspective structural diagram of a still-picture acquisition apparatus.

This still-picture acquisition apparatus structurally differs from the second embodiment in that the sample 3 on a stage 17 is observed through a dry objective lens 18 from the bottom of the incubator by an inverted microscope 16. This still-picture acquisition apparatus of course acquires the same advantages as that of the second embodiment.

This inverted microscope 16 has a tri-ophthal lens barrel 19 on the observation path from the objective lens 18 and an image from the objective lens 18 is switched to the eyepieces (21) side or the camera body (22) side by manipulating an optical-path switching lever 20 of the eyepieces 19.

The micro-manipulator 12 is provided on the support platform 11, with the cell electrode 13 attached to the distal end of the micro-manipulator 12. The cell electrode 13 is a probe which is transfixed into the sample 3 and detects a cellular physiological electric signal which varies in accordance with the transmission of excitation of the sample 3. The cell electrode 13 has a capability of detecting a pulse-like signal in accordance with the movement of a neurocyte. The cell electrode 13 is connected to the I/O port of the computer 9 via the amplifier 14.

The computer 9, like that of the second embodiment, has the function of a still-picture acquisition section 15 which determines the timing based on the dynamic behavior of the sample 3, i.e., the timing of fetching the image of the sample 3 in synchronism with the electric signal from the cell electrode 13 that is detected according to the dynamic behavior of the sample 3, repeatedly fetches the image of the sample 3 at this timing, and acquires a still picture by accumulating or averaging those picked-up images.

Figure 9:
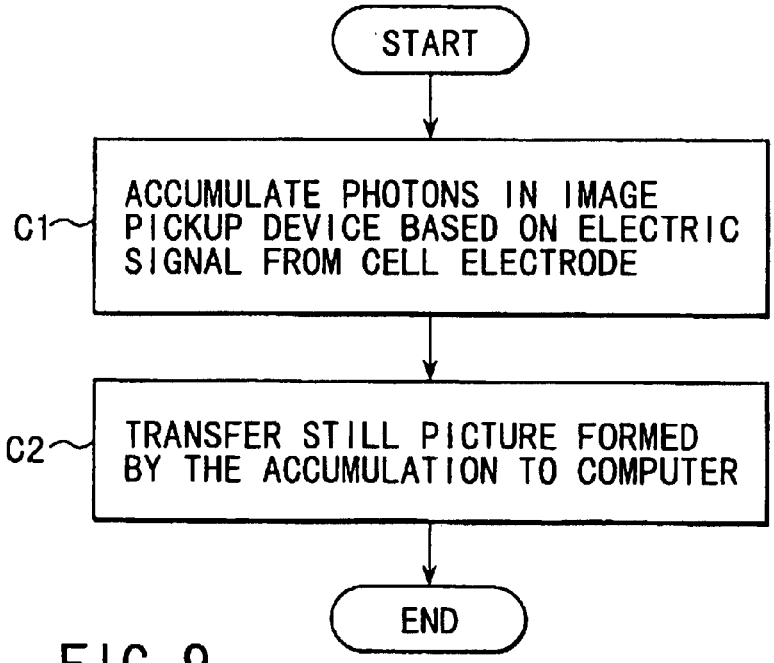
FIG. 9 is a flowchart for explaining the operation of this modification.

This modification, unlike the first embodiment, need not monitor a change in image data of the sample 3 so that the image data should not necessarily be transferred to the computer 9 every time the image of the sample 3 is picked up. The photons are accumulated on the solid-state image pickup device in the camera body 22 by driving the solid-state image pickup device for a short period of time based on the electric signal from the cell electrode 13 transfixed to the sample 3 as a neurocyte (step C1 in FIG. 9). This process reduces quantum noise. The camera body 22 transfer still picture data, finally formed, to the computer 9 (step C2). This eliminates the need for the averaging process on the computer 9 and thus reduces the operational burden on the computer 9 so that even an inexpensive, low-performance computer can provide the desired effects.

This modification has been discussed with reference to the case where the cellular physiological electric signal of a living cell itself to be observed and sensed is detected using the cell electrode 13. But, organic cells in the sample 3 work together so that the area whose electric signal is to be detected by the cell electrode 13 need not be the same as the living cell that is to be observed and sensed. That is, the same advantages as obtained by the second embodiment can be acquired even if the electric signal from an ambient area, such as an adjoining cell or another portion of the organ, is monitored.

Third Embodiment

The third embodiment of the present invention will now be described. To avoid the redundant description, like or same reference numerals are given to those components which are the same as the corresponding components shown in FIG. 5.

Figure 10:
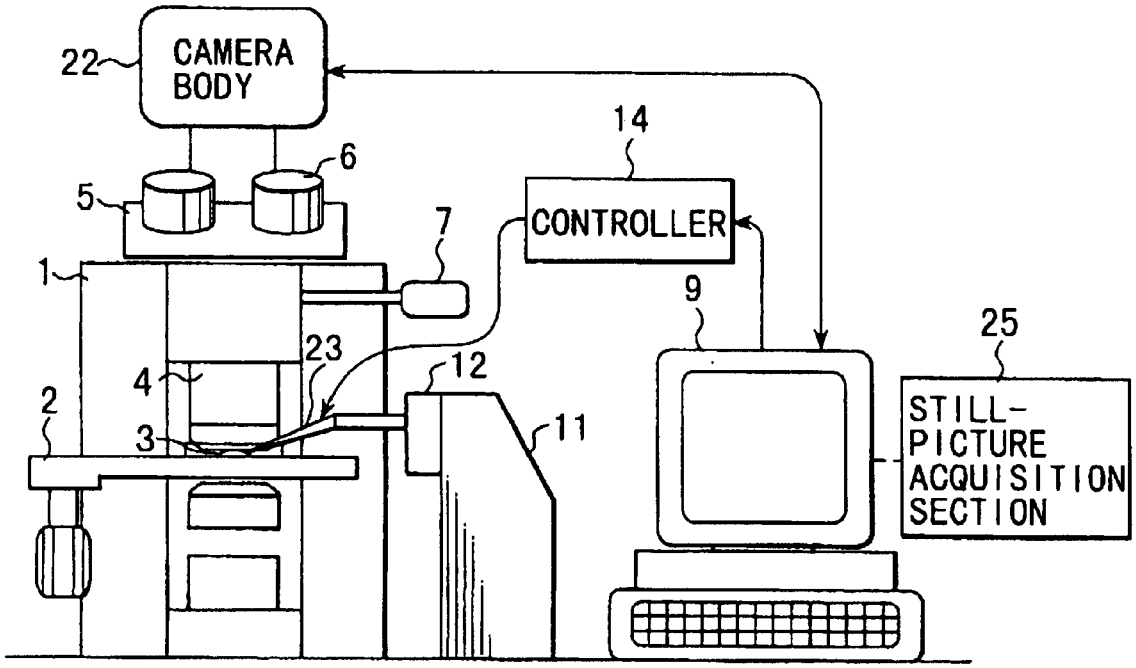
FIG. 10 is a structural diagram illustrating a still-picture acquisition apparatus according to a third embodiment of the present invention.

FIG. 10 is a structural diagram of a still-picture acquisition apparatus.

This still-picture acquisition apparatus differs from that of the second embodiment in that a micro-injector 23 is used instead of the cell electrode 13. The micro-manipulator 12 having a driving mechanism is provided on the support platform 11, and the micro-injector 23 is attached to the micro-manipulator 12.

This micro-injector 23 injects a predetermined dose of an indicator in a pulse form, which promotes or inhibits the excitation of a neurocyte as the sample 3, into the sample 3 and has an electromagnetic injector. The micro-injector 23 injects a predetermined dose of the indicator in response to the electric control signal (stimulation signal or the like which instructs stimulation to a cell) from a controller 24.

A control signal to the controller 24 is sent from the I/O port of the computer 9 so that the micro-injector 23 is activated to make micro-injection in response to the control signal from the computer 9.

Figure 11:
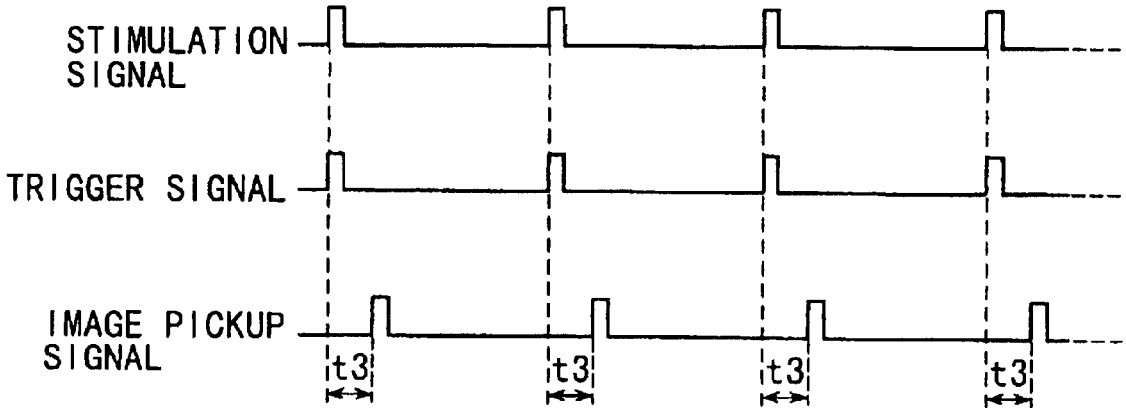
FIG. 11 is a timing chart for explaining signal processing in this apparatus.

That is, a still-picture acquisition section 25 of the computer 9 causes the micro-injector 23 to inject the indicator in the sample 3 to stimulate the sample 3, determines the timing of fetching the image of the sample 3 in synchronism with the timing of this stimulation, and sends a control signal (an image pickup signal indicating image sensing) to the camera body 8 so as to fetch the image of the sample 3 at a specific timing immediately after the activation of the micro-injector 23 (after a predetermined delay time t3) (see the timing chart in FIG. 11).

Accordingly, upon reception of the signal from the computer 9, the camera body 8 picks up the image of the sample 3 at the specific timing.

The still-picture acquisition section 25 of the computer 9 fetches the sensed images of the sample 3 and overwrites the image data while accumulating or averaging those images, thereby yielding a still picture.

The operation of the thus constructed apparatus will now be discussed.

The sample 3 is a small experimental animal, a living organ or a living cell, for example, and the dynamic behavior of its neurocyte is to be observed here.

The micro-injector 23 injects a predetermined dose of an indicator in a pulse form, which promotes or inhibits the excitation of the sample 3, into the sample 3 in response to the electric control signal from the controller 24.

The experimental process is controlled by the controller 24 in accordance with the previously loaded program. As the control signal is sent to the controller 24 from the computer 9 at a predetermined timing, the micro-injection of the micro-injector 23 is carried out.

The still-picture acquisition section 25 of the computer 9 sends the control signal to the camera body 8 so as to fetch the image of the sample 3 only at a specific timing immediately after the activation of the micro-injector 23 (after a predetermined delay time t3). 1

The still-picture acquisition section 25 repeats giving an instruction for micro-injection to the sample 3, repeatedly fetches the image of the sample 3 at this timing, accumulates or averages the images to overwrite the image data, thereby yielding the still picture of the neurocyte 3.

According to the third embodiment, as apparent from the above, an indicator is injected into the sample 3 to stimulate the sample 3 by the micro-injector 23, the timing of fetching the image of the sample 3 is determined in synchronism with the injection timing, the image of the sample 3 is fetched at a specific timing, for example, immediately after the activation of the micro-injector 23 (after a predetermined delay time t3), and those images are accumulated or averaged to provide a still picture.

Figure 12:
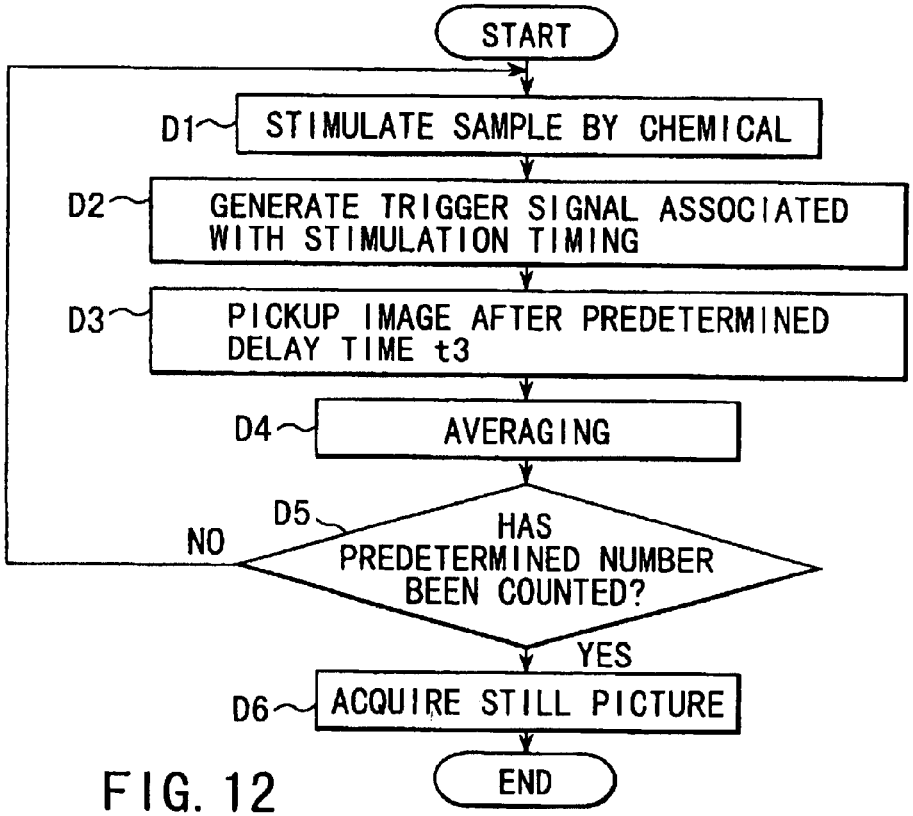
FIG. 12 is a flowchart for explaining the operation of this apparatus.

Next, the operation of this embodiment will be described by reference to FIG. 12.

Under the observation conditions in which the sample 3 demonstrates a pulsative dynamic behavior such as the behavior after injection of the chemical, the sample is stimulated by the chemical (step D1), the trigger signal associated with the timing of giving chemical stimulation is generated by the computer 9 in accordance with the setting of the experiment program (step D2), the image of the sample 3 is picked up at a predetermined delay time t3 (step D3), and averaging, for example, is performed (step D4).

It is to be noted that a counter for counting a number of execution of a procedure corresponding to a series of steps Dl to D4, is provided in the computer in advance, and a value on the counter is automatically incremented by one every when the process is executed.

It is determined whether or not a number of execution of the procedure has reached a predetermined number, based on the value of the counter (step D5). If no, the procedure is repeatedly executed. If yes, a still-picture, which is produced from the averaging, is acquired (step D6).

This makes it possible to acquire high-quality still pictures of the sample 3 at a specific timing in the process of giving chemical stimulation.

As the injection of the indicator and image pickup are carried out in accordance with the program that has previously been loaded into the computer 9, it is possible to set the image pickup timing before the injection of the indicator. The image pickup is not therefore limited to the timing after the injection of the indicator.

Although chemical stimulation is applied by the microinjector 23 as one example in the third embodiment, the cell electrode which is transfixed into the cell or is close contact therewith may be used instead of the micro-injector 23 to apply the control signal from the computer 9 to the cell as electric stimulation. Such electric stimulation is known to cause the dynamic behavior of a sample in which case needless to say the same advantages as obtained by the third embodiment can be acquired.

The third embodiment, like the second embodiment, can acquire the same advantages when the sample 3 is observed through the dry objective lens 18 from the bottom of the incubator by the inverted microscope 16.

The third embodiment has been discussed with reference to the case where a minute dose of an indicator is injected into a living cell itself to be observed and sensed. However, the present invention is not limited to this particular case but organic cells in the sample work together so that the area whose electric signal is to be detected need not be the same as the living cell that is to be observed and sensed. That is, the same advantages as discussed in the foregoing description can be acquired even if a minute dose of the indicator is injected into an ambient area, such as an adjoining cell or the culture solution outside the cell.

Fourth Embodiment

The fourth embodiment of the present invention will now be described. To avoid the redundant description, like or same reference numerals are given to those components which are the same as the corresponding components in FIG. 10.

The fourth embodiment differs from the third embodiment in that optical stimulation is employed in place of the chemical stimulation made by the micro-injector 23. The following discusses this difference.

Figure 13:
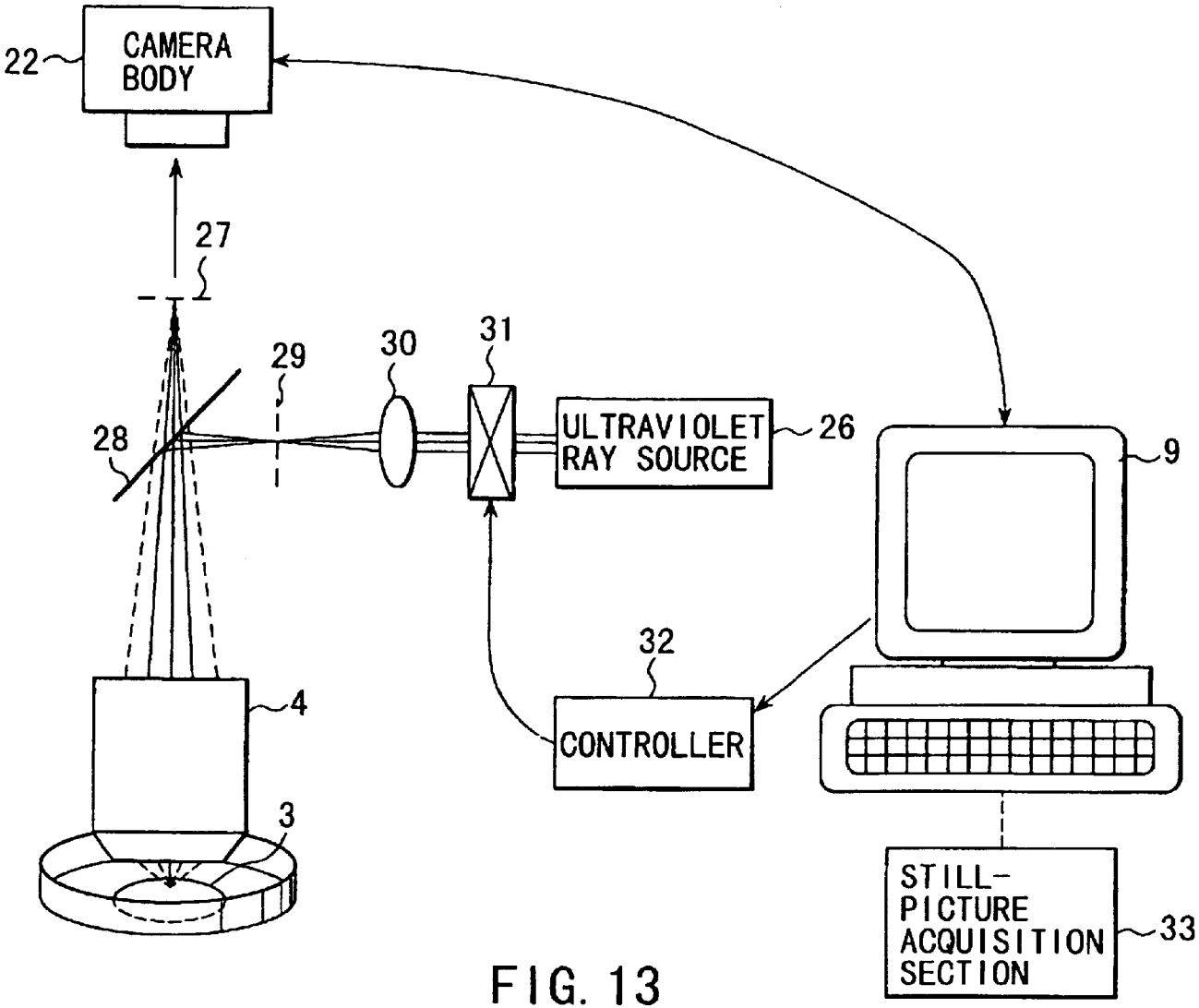
FIG. 13 is a structural diagram illustrating only the features of a still-picture acquisition apparatus according to a fourth embodiment of the present invention.

FIG. 13 is a structural diagram of a still-picture acquisition apparatus showing only this difference.

Like the third embodiment, the fourth embodiment uses the microscope body 1, the camera body 22 and the computer 9. An optical stimulating system by an ultraviolet ray source 26 is installed in the microscope body 1.

The structure of this optical stimulating system will now be discussed. An image plane 27 of the sample 3 is formed by the objective lens 4 and a dichroic mirror 28 which reflects ultraviolet rays and passes visible rays is placed between the objective lens 4 and the image plane 27. This dichroic mirror 28 forms an image plane 29.

The ultraviolet ray source 26 and a condenser lens 30 are disposed on the optical path of the image plane 29 formed by the dichroic mirror 28, so that the UV light is condensed on the image plane 29 via an electromagnetic shutter 31.

The wavelength and power of the ultraviolet ray source 26 are so set as to open a caged compound introduced into the living cell in the sample 3. The ultraviolet ray source 26 controls the discharge of a physiological activator in the condensing portion on the sample 3.

When the electromagnetic shutter 31 is opened, the UV light condensed on the image plane 29 is reflected at the dichroic mirror 28 and is condensed on the sample 3 by the objective lens 4.

With regard to the structure of the electric system, the electromagnetic shutter 31 is normally closed and is opened and closed for a predetermined time in response to the electric control signal from a controller 32.

A control signal to the controller 32 is sent from the I/O port of the computer 9 so that the electromagnetic shutter 31 is activated in response to the control signal from the computer 9.

The computer 9 has the function of a still-picture acquisition section 33 which emits the UV light from the ultraviolet ray source 26 onto the sample 3 to stimulate the sample 3, determines the timing of fetching the image of the sample 3 in synchronism with the timing of giving stimulation to the sample 3, fetches the image of the sample 3 only at a specific timing immediately after the activation of the ultraviolet ray source 26, and acquires a still picture by accumulating or averaging those picked-up images.

The operation of the thus constructed apparatus will now be discussed.

The sample 3 is a small experimental animal, a living organ or a living cell, for example, and the behavior of the sample 3 is to be observed here.

A caged compound has previously been introduced into the sample 3 to be observed.

The experimental process is controlled by the computer 9 in accordance with the previously loaded program. AS the control signal is sent to the controller 32 from the computer 9 at a predetermined timing, the electromagnetic shutter 31 is actuated.

The still-picture acquisition section 33 of the computer 9 sends the control signal to the camera body 22 so as to fetch the image of the sample 3 at a predetermined timing, and picks up the image of the sample 3 at a specific timing immediately after the activation of the electromagnetic shutter 31.

The still-picture acquisition section 33 of the computer 9 emits the UV light from the ultraviolet ray source 26 onto the sample 3 to stimulate the sample 3, determines the timing of fetching the image of the sample 3 in synchronism with the timing of giving stimulation to the sample 3, fetches the image of the sample 3 at a specific timing immediately after the activation of the ultraviolet ray source 26, and accumulates or averages those picked-up images to overwrite the image data, thereby providing a still picture.

Figure 14:
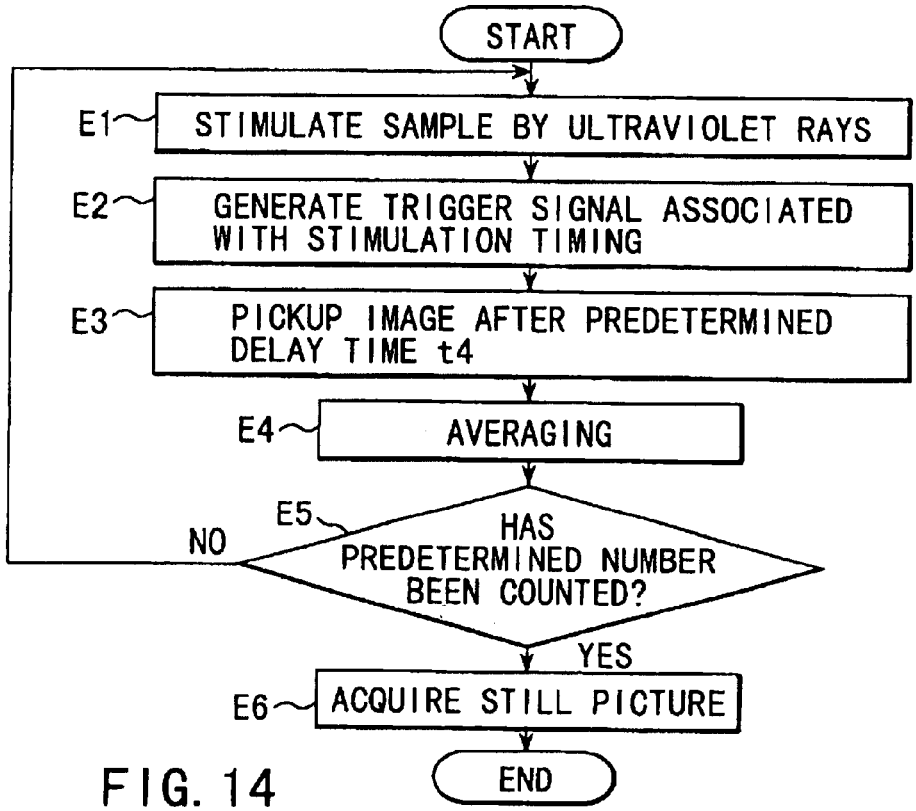
FIG. 14 is a flowchart for explaining the operation of this apparatus.

Next, the operation of this embodiment will be described by reference to FIG. 14.

Under the conditions of observing the dynamic behavior of a living cell caused by the release of the physiological activator by the caged compound, the sample is stimulated by the ultraviolet rays (step E1), the trigger signal associated with the timing of releasing the physiological activator is generated by the computer 9 in accordance with the setting of the experiment program (step E2), the image of the sample 3 is picked up at a predetermined delay time t4 (step E3), and averaging, for example, is performed (step E4).

It is to be noted that a counter for counting a number of execution of a procedure corresponding to a series of steps E1 to E4, is provided in the computer in advance, and a value on the counter is automatically incremented by one every when the process is executed.

It is determined whether or not a number of execution of the procedure has reached a predetermined number, based on the value of the counter (step E5). If no, the procedure is repeatedly executed. If yes, a still-picture, which is produced from the averaging, is acquired (step E6).

This makes it possible to acquire high-quality still pictures of the sample 3 at a specific timing in the process immediately after opening the caged compound.

Because the release of the physiological activator by the caged compound and the image pickup are carried out in accordance with the program previously loaded into the computer 9, it is possible to set the image pickup timing before the release of the physiological activator. The image pickup is not therefore limited to the timing immediately after the opening of the caged compound.

The above-described third embodiment has adopted the case where the sample 3 is stimulated by a chemical, and the fourth embodiment has adopted the case where the sample 3 is stimulated by light. It is to be noted that stimulation techniques concerning the present invention is not limited to these cases. For example, there may be provided means for stimulating the sample by electricity, instead of the chemical or light.

Fifth Embodiment

The fifth embodiment of the present invention will now be discussed.

Figure 15:
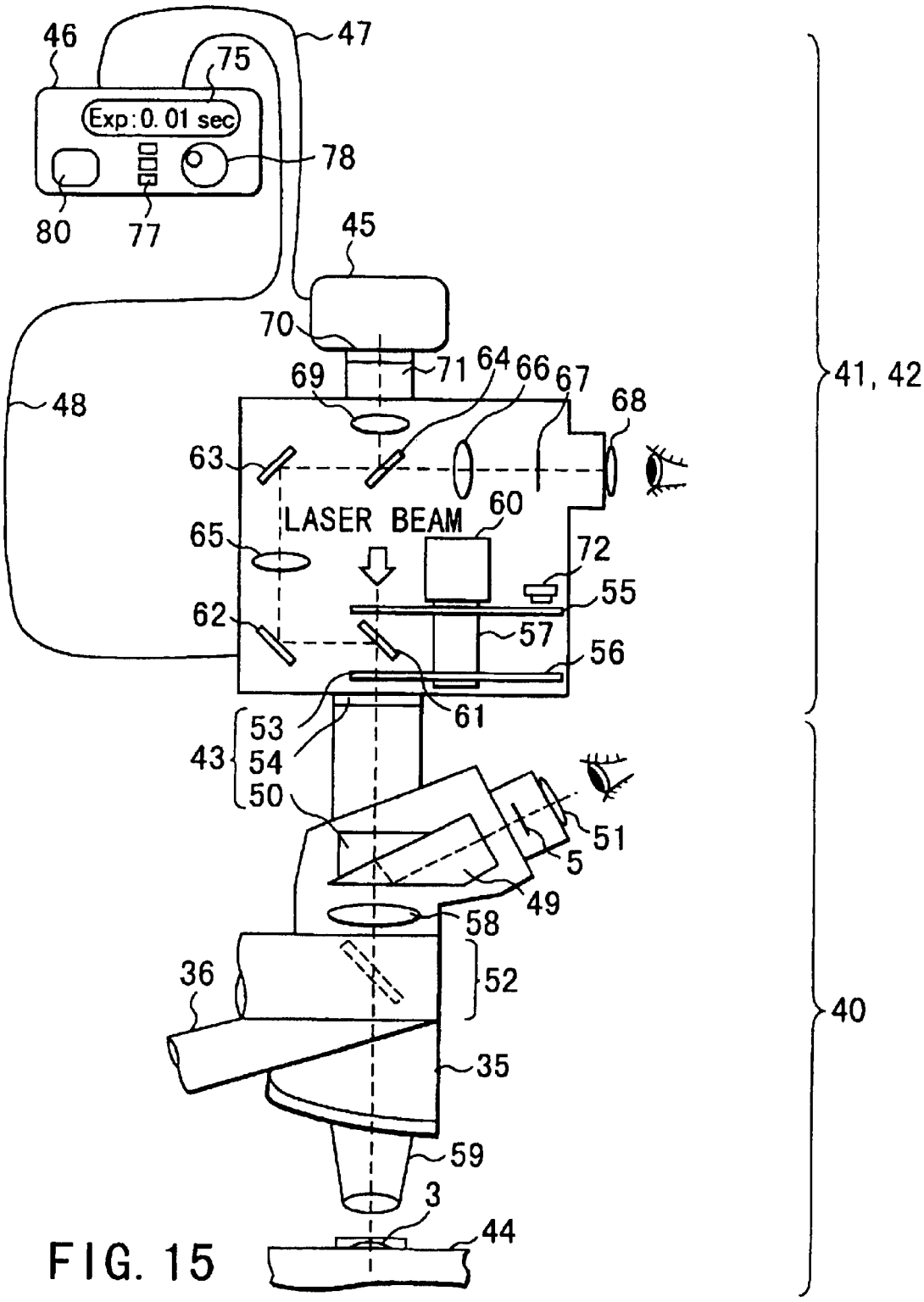
FIG. 15 is a general structural diagram illustrating a still-picture acquisition apparatus for a confocal microscope which is to be adapted to a still-picture acquisition apparatus according to a fifth embodiment of the present invention.
Figure 16:
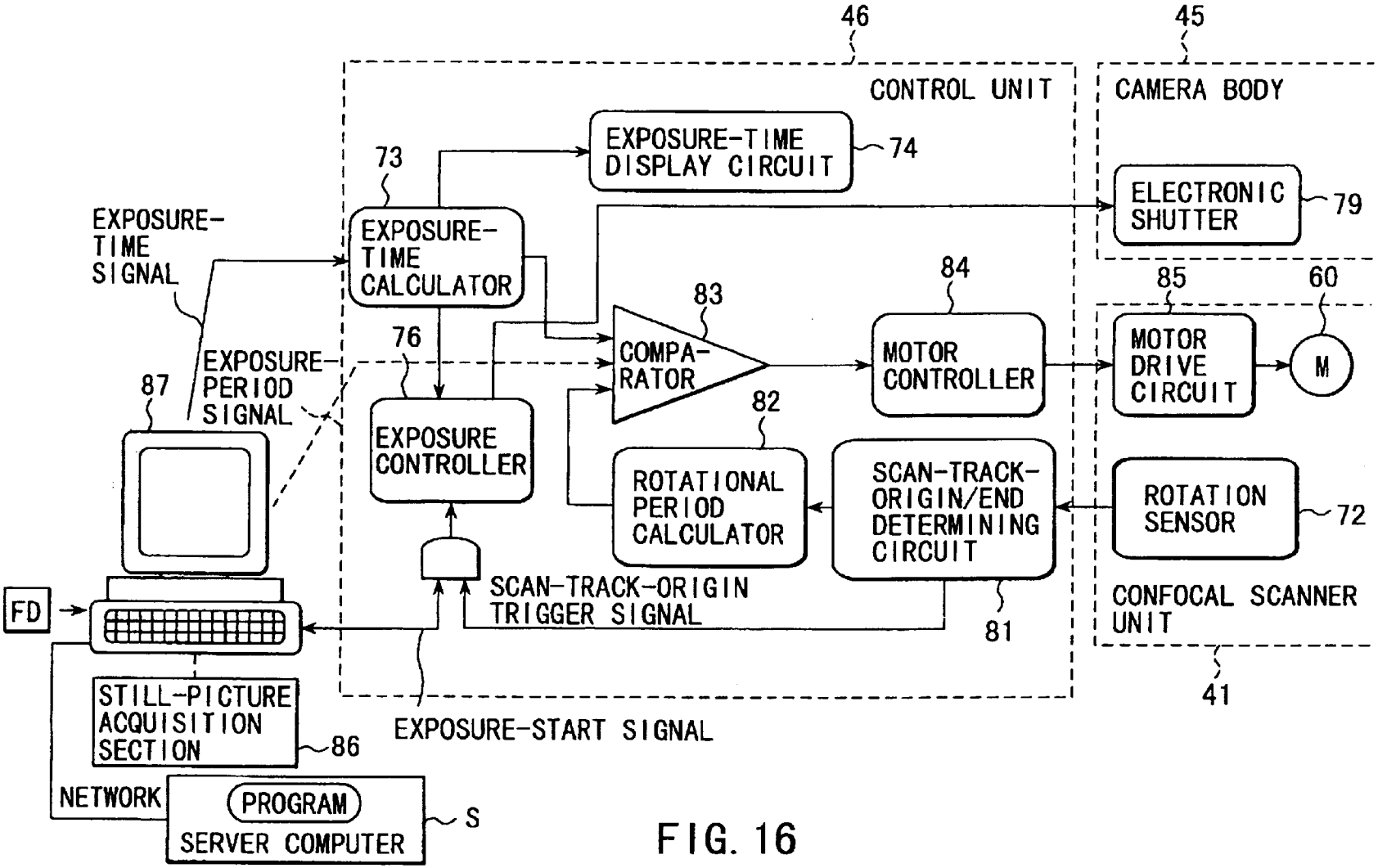
FIG. 16 is a block diagram for explaining functions of this apparatus.

The fifth embodiment is constructed in such a way that a rotary confocal disk scanner is inserted between the camera body and the tri-ophthal lens barrel in the first to fourth embodiments to permit a confocal image to be sensed. FIGS. 15 and 16 show the structure of a still-picture acquisition apparatus for a confocal microscope which uses a confocal scanner unit equipped with an attachment mount for a microscope and an attachment mount for an image pickup device.

This still-picture acquisition apparatus comprises a combination of a microscope 40, a confocal scanner unit 41 and an image pickup device 42.

The microscope 40 is an erecting type microscope equipped with a tri-ophthal lens barrel 43 having a pickup optical path. The illustrated portion is only the optical observing system above the top surface of a stage 44.

The image pickup device 42 comprises a camera body 45 and a control unit 46 which is connected to the camera body 45 and the confocal scanner unit 41 by cables 47 and 48 respectively.

The operation of the optical system will now be discussed.

A 30-degree prism 49 and a cylindrical prism 50 are arranged on the tri-ophthal lens barrel 43 in an exchangeable manner on the slider.

When the 30-degree prism 49 is inserted in the optical path, observation by eyes through eyepieces 51 is possible. The possible observation by eyes is either the transmitted-light based observation under the illumination light from an unillustrated transmission illuminator located under the stage 44 or direct-fluorescent-light based observation using a direct-light projector 52 as an optional type. This still-picture acquisition apparatus can therefore used as an ordinary microscope.

When the cylindrical prism 50 is inserted in the optical path, an optical path is formed which connects an image plane 53 formed above the cylindrical portion of the triophthal lens barrel 43 to the sample 3 in a conjugating manner. This can ensure eye-based observation or photographing of a confocal image by means of the confocal scanner unit 41.

The operation for the observation will now be discussed.

The confocal scanner unit 41 is attached above the cylindrical portion of the tri-ophthal lens barrel 43 via an image-pickup-device mount 54. Connected to the confocal scanner unit 41 is an unillustrated laser fiber which is connected to a laser placed on the floor apart from the table on which microscope is placed in order to prevent transmission of vibration, heat and the like. Accordingly, a laser beam is led into the confocal scanner unit 41.

The laser beam led into the confocal scanner unit 41 is converted to parallel light by an unillustrated collimator lens, which in turn enters a condensing disk 55 having a micro-lens array formed thereon. Since the pattern of the micro-lenses on the condensing disk 55 and the pattern of pin holes on a pin-hole disk 56 are formed by using the semiconductor process, the similarity of the patterns is assured. The alignment of those patterns is adjusted in such a way that the patterns are aligned with each other in the manufacturing process of coupling the two disks by a coupling shaft 57.

Accordingly, the laser beam condensed by the micro-lenses provided on the condensing disk 55 can pass through the associated pin holes on the pin-hole disk 56.

The pin-hole disk 56 is so arranged as to coincident with the image plane 53, so that the light having passed the pin holes is converged on the sample 3 via an image forming lens 58 and objective lens 59.

A fluorescent indicator is injected into the cell of the sample 3 and emits fluorescent light when excited by a laser beam.

The fluorescent light coming out of the sample 3 travels through the objective lens 59 and the image forming lens 58 again and returns to the pin-hole disk 56, thereby forming a confocal optical path.

The fluorescent light that has passed the pin-hole disk 56 from the sample side is reflected by a dichroic mirror 61 and is directed away from the laser beam path and leftward in the diagram. The fluorescent light is then reflected twice respectively by mirrors 62 and 63 and is directed rightward in the diagram. A mirror 64 is arranged in an insertable and removable manner. With the mirror 64 set out of the optical path, a confocal image which is reformed on an image plane 67 by relay lenses 65 and 66 can be observed the naked eyes through eyepieces 68.

With the mirror 64 inserted in the optical path, on the other hand, the optical path is reflected upward and a confocal image which is reformed on an image plane 70 by the relay lenses 65 and a relay lens 69 can be picked up by the camera body 45 that is attached via a mount 71.

The electric circuit that controls the camera body 45 is incorporated in the control unit 46. This electric circuit is connected to the camera body 45 by a cable 47 and to an unillustrated motor drive circuit and a rotation sensor 72 in the confocal scanner unit 41 by a capable 48, so that it controls a motor 60 and the camera body 45 while detecting the rotational position of the motor 60 by means of the rotation sensor 72.

The rotation sensor 72 detects the rotational position of the pin-hole disk 56, particularly, the origin and end points of a scan track formed on the pin-hole pattern and generates a trigger signal.

A description will now be given of the control of the motor 60 and camera body 45 by the control unit 46 referring to the block diagram of FIG. 16.

A photometric signal from a photometer of the camera body 45 is input to an exposure-time calculator 73 where the exposure time is calculated, the exposure time is displayed on a display panel 75 shown in FIG. 15 via an exposure-time display circuit 74 and the exposure-time signal is output to an exposure controller 76.

This exposure controller 76 is connected to a mode select button 77 and a control knob 78 shown in FIG. 15, so that it can set the photometric mode, the sensitivity and the amount of exposure correction. This exposure controller 76 opens or closes an electronic shutter 79 in the camera body 45 in accordance with the exposure-time signal from the exposure-time calculator 73 to thereby control exposure. An exposure-start signal is interlocked with an exposure button 80 shown in FIG. 15 which is operated by the user as well as a scan-track-origin trigger signal generated from the signal from the rotation sensor 72 in the confocal scanner unit 41. Therefore, exposure is so controlled as to be initiated in synchronism with the origin of the scan track of the pin-hole pattern formed on the pin-hole disk 56 of the rotary confocal disk scanner.

Produced from the signal from the rotation sensor 72 in the confocal scanner unit 41 is a scan-track-end trigger signal which, like the scan-track-origin trigger signal, is synchronous with the end point of the scan track on the pin-hole pattern formed on the pin-hole disk 56.

The scan-track-origin and scan-track-end trigger signals are input via a scan-track-origin/end determining circuit 81 to a rotational period calculator 82 which calculates the time needed for the disk scanner to make one turn and outputs a rotational period signal.

A comparator 83 compares the exposure-time signal with the rotational period signal and sends a difference signal indicating the difference therebetween to a motor controller 84. This motor controller 84 sends a drive signal to the motor 60 via a motor drive circuit 85, thereby forming a control loop that causes the rotational period to match with the exposure time.

Accordingly, the exposure time coincides with the rotational period and the timing for initiating exposure is interlocked with the scan-track-origin trigger signal. As a result, the timing for the end of exposure is also synchronized with the scan-track-end trigger signal.

The still-picture acquisition apparatus for a confocal microscope which has the above-described structure controls the timing of starting exposure and the timing of ending exposure in synchronism with the rotational position of the rotary disk scanner, and can controls the (total) number of rotations of the disk within the exposure time at a constant value and can keep the positions of the disk pattern at the beginning and end of exposure at the origin and end point of the scan track pattern by synchronizing the exposure initiating and ending timings with the rotational position of the disk.

The above explains the structure of the still-picture acquisition apparatus for a confocal microscope which uses micro-lenses equipped rotary disk scanner.

This still-picture acquisition apparatus receives the I/O control signal from a computer 87 having a still-picture acquisition section 86 and prevents superimposition of image noise such as scanning irregularity in the image obtained by repeated image pickups based on the I/O control signal by synchronizing the dynamic behavior of the cell with the rotation of the rotary scanner.

The exposure time at which the dynamic behavior of the cell as the sample 3 is captured as a still picture is previously programmed in the computer 87. The computer 87 sends the exposure-time signal to the exposure-time calculator 73 which in turn determines the exposure time. The photometer of the camera body 45 and the connection to the exposure-time calculator 73 from this photometer are not illustrated.

Because the timing of initiating exposure is determined by the dynamic behavior of the sample 3, the exposure-start signal is supplied to the exposure controller 76 from the computer 87. The exposure button that the user manipulates is not illustrated.

The operation of the thus constructed apparatus will be discussed below.

As the association of the dynamic behavior of the sample 3 with the computer 87 is the same as that in the operations of the first to fourth embodiments, its description will not be repeated.

When the exposure-start signal and the exposure-time signal are generated in accordance with the timing of acquiring an image sent from the still-picture acquisition section 86 and the exposure time, the comparator 83 compares the exposure-time signal with the rotational period signal and controls the rotational period (rotational speed) of the scanner. This can ensure synchronization of the exposure time with the rotational period and can permit the exposure initiating timing with the scan-track-origin trigger signal, thereby preventing superimposition of image noise such as scanning irregularity in the image obtained by image pickups.

Modification of Fifth Embodiment

A modification of the fifth embodiment will now be discussed.

In the case of observing the behavior of a living cell which shows a periodic behavior such as cardio pulsation that has been explained the foregoing description of the first embodiment, an exposure-period signal generated by the computer 87 may be supplied to the comparator 83 for synchronization of the rotation of the rotary scanner with the period of a variation in the behavior of the cell. In this case, it is possible to maintain the image pickup conditions evenly by keeping constant the t rack position of the rotary disk at the instant when image pickup is initiated in accordance with the pulsation of a cardio cell.

Keeping the track position always constant may lead to repeated generation of moire noise due to the uneven scanning. In this case, exposure may be repeated 50 times, for example, and the phase of the rotary disk scanner may be advanced by 1/50 of one rotation (360 degrees) for each cardio pulsation period, so that the phase of the rotary disk needed to pick up a still picture is controlled evenly.

According to the modification of the fifth embodiment, even in picking up a confocal mode still picture using the rotary confocal disk scanner, the scanner is controlled by synchronizing the rotation of the scanner with the dynamic behavior of the sample so that it is possible to acquire a high-quality still picture at a specific timing in the periodic movement while preventing superimposition of image noise such as scanning irregularity in the image obtained by image pickups. This can provide high-quality still pictures having a confocal effect.

It is to be noted that the present invention is not limited to the combination of a micro-lenses equipped confocal disk scanner and a digital camera.

Although the fifth embodiment achieves scanning by using a micro-lenses equipped rotary disk scanner, the present invention is in no way limited to this particular type, but scanning may be accomplished by using, for example, a Galvano mirror.

The apparatuses of the fifth embodiment and its modification can be adapted to the first to fourth embodiments.

Although the individual embodiments have been described with reference to the case where still pictures are acquired, they may be modified to provide pseudo moving pictures (animation) from the images that are picked up at the individual timings.

The computer-based sequence of procedures that has been discussed in the foregoing descriptions of the individual embodiments may be stored in the formed of program components in a computer-readable storage medium (e.g., a floppy disk which may be inserted into the computer 87 as shown in FIG. 16) in advance, and may be loaded and run by the computer, whenever needed. Furthermore, as indicated in FIG. 16, the above program components may be stored in another computer S which is connected to the computer 87 via a network, and the computer 87 may access the computer S to load the above program components, as a computer program data signal embodied in a data stream, onto the computer 87 via the network and run them, whenever needed.

As apparent from the above description, the present invention can provide a still-picture acquisition method and apparatus applied to a microscope, which can acquire as high-quality still pictures the instantaneous status of a living cell which varies with time in accordance with the application of external stimulation or the in-vivo order.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

[1. A still-picture acquisition apparatus for a microscope, comprising:

means for repeatedly picking up an image of a sample at a timing based on a dynamic behavior of said sample; and means for acquiring a still picture by accumulating or averaging picked-up images.]

[2. The apparatus according to claim 1, further comprising means for detecting a periodic change in brightness of said sample and determining said image-pickup timing in synchronism with said change in brightness.]

[3. The apparatus according to claim 2, wherein said determining means sets said image-pickup timing to a point of a predetermined delay time from a timing at which a value of said brightness exceeds a specific threshold value.]

[4. The apparatus according to claim 1, further comprising means for determining said image-pickup timing in synchronism with an electric signal to be detected in accordance with said dynamic behavior of said sample.]

[5. The apparatus according to claim 4, wherein said determining means sets said image-pickup timing to a point of a predetermined delay time from a timing at which a value of said electric signal exceeds a specific threshold value.]

[6. The apparatus according to claim 1, further comprising means for determining said image-pickup timing in synchronism with a timing at which said sample is stimulated.]

[7. The apparatus according to claim 6, wherein said determining means sets said image-pickup timing to a point of a predetermined delay time from a timing at which said sample is stimulated.]

[8. The apparatus according to claim 6, further comprising means for stimulating said sample by a chemical.]

[9. The apparatus according to claim 6, further comprising means for stimulating said sample by light.]

[10. The apparatus according to claim 6, further comprising means for stimulating said sample by electricity.]

[11. The apparatus according to claim 1, further comprising:

a scanner for scanning said sample with a laser beam; and means for controlling said scanner in accordance with said timing based on said dynamic behavior of said sample.]

[12. A still-picture acquisition apparatus for a microscope, comprising:

an image pickup device for accumulating images of a sample in synchronism with an electric signal to be detected in accordance with a dynamic behavior of said sample; and means for transferring a still picture formed by accumulation of said images of said sample in said image pickup device.]

[13. A still-picture acquisition method applied to a microscope, comprising the steps of:

repeatedly picking up an image of a sample at a timing based on a dynamic behavior of said sample; and acquiring a still picture by accumulating or averaging picked-up images.]

[14. The method according to claim 13, further comprising the step of detecting a periodic change in brightness of said sample and determining said image-pickup timing in synchronism with said change in brightness.]

[15. The method according to claim 13, further comprising the step of determining said image-pickup timing in synchronism with an electric signal to be detected in accordance with said dynamic behavior of said sample.]

[16. The method according to claim 13, further comprising the step of determining said image-pickup timing in synchronism with a timing at which said sample is stimulated.]

[17. A computer-readable storage medium having computer program components stored thereon that perform acquiring a still picture, the program components comprising:

means for causing a computer to perform control to repeatedly pick up an image of a sample at a timing based on a dynamic behavior of said sample; and means for causing a computer to acquire a still picture by accumulating or averaging picked-up images.]

[18. A computer program data signal embodied in a data stream comprising program components that perform acquiring a still picture, the program components comprising:

means for causing a computer to perform control to repeatedly pick up an image of a sample at a timing based on a dynamic behavior of said sample; and means for causing a computer to acquire a still picture by accumulating or averaging picked-up images.]

*19. A still-picture acquisition apparatus for a microscope, comprising:*

*means for determining image-pickup timings for picking up images of a living cell as a sample, based on timings of periodic behaviors of the living cell;*

*means for picking up only images of instantaneous statuses in the periodic behaviors of the living cell at specific timings, in synchronism with the determined image-pickup timings; and*

*means for acquiring a still picture of the instantaneous statuses of the living cell by accumulating or averaging the picked-up images.*

*20. The apparatus according to claim 19, wherein the timings of the periodic behaviors of the living cell are determined by detecting changes in brightness.*

*21. The apparatus according to claim 20, wherein the picking-up means repeatedly picks up only images of the living cell at specific timings in periodic changes in cardio pulsations of the living cell.*

*22. The apparatus according to claim 20, wherein the determining means determines each of the image-pickup timings as a timing that is a predetermined delay time after a timing at which a value of the brightness exceeds a specific threshold value.*

*23. The apparatus according to claim 19, further comprising means for determining the timings of the periodic behaviors of the living cell by detecting electric signals with a probe.*

*24. The apparatus according to claim 23, wherein the living cell is a neurocyte, and the probe is transfixed into the neurocyte and detects electric signals which vary in accordance with transmissions of excitation of the neurocyte.*

*25. The apparatus according to claim 23, wherein the picking-up means repeatedly picks up only images of the living cell at specific timings immediately after the periodic behaviors of the living cell occur.*

*26. The apparatus according to claim 23, wherein the determining means determines each of the image-pickup timings as a timing that is a predetermined delay time after a timing at which an electric signal that exceeds a specific threshold value is detected with the probe.*

*27. The apparatus according to claim 19, further comprising means for determining the image-pickup timings in synchronism with timings at which the living cell is stimulated.*

*28. The apparatus according to claim 27, wherein the determining means determines each of the image-pickup timings as a timing that is a predetermined delay time after a timing at which the living cell is stimulated.*

*29. The apparatus according to claim 27, further comprising means for stimulating the living cell with a chemical.*

*30. The apparatus according to claim 27, further comprising means for stimulating the living cell with light.*

*31. The apparatus according to claim 27, further comprising means for stimulating the living cell with electricity.*

*32. The apparatus according to claim 19, further comprising:*

*a scanner for scanning the living cell with a laser beam; and*

*means for controlling the scanner in accordance with the determined image-pickup timings.*

*33. The apparatus according to claim 19, further comprising:*

*means for transferring the acquired still picture to a computer.*

*34. The apparatus according to claim 19, wherein a scanner scans the living cell with a laser beam.*

*35. The apparatus according to claim 34, wherein the scanner includes a rotary disk scanner.*

*36. A still-picture acquisition method for a microscope, comprising:*

*determining image-pickup timings for picking up images of a living cell as a sample, based on timings of periodic behaviors of the living cell;*

*picking up only images of instantaneous statuses in the periodic behaviors of the living cell at specific timings, in synchronism with the determined image-pickup timings; and*

*acquiring a still picture of the instantaneous statuses of the living cell by accumulating or averaging the picked-up images.*

*37. The method according to claim 36, further comprising determining the timings of the periodic behaviors of the living cell by detecting changes in brightness.*

*38. The method according to claim 36, further comprising determining the timings of the periodic behaviors of the living cell by detecting electric signals with a probe.*

*39. The method according to claim 36, further comprising determining the image-pickup timings in synchronism with timings at which the living cell is stimulated.*

*40. A computer-readable storage medium encoded with a computer program that is executable by a computer to perform a process comprising:*

*determining image-pickup timings for picking up images of a living cell as a sample, based on timings of periodic behaviors of the living cell;*

*picking up only images of instantaneous statuses in the periodic behaviors of the living cell at specific timings, in synchronism with the determined image-pickup timings; and*

*acquiring a still picture of the instantaneous statuses of the living cell by accumulating or averaging the picked-up images.*

*41. A still-picture acquisition apparatus for a microscope, comprising:*

*a computer configured to determine image-pickup timings for picking up images of a living cell as a sample, based on timings of periodic behaviors of the living cell;*

*a scanner which picks up only images of instantaneous statuses in the periodic behaviors of the living cell at specific timings, in synchronism with the determined image-pickup timings; and*

*a processor configured to acquire a still picture of the instantaneous statuses of the living cell by accumulating or averaging the picked-up images.*

*42. A still-picture acquisition apparatus for a microscope, comprising:*

*a monitoring device which detects periodic behaviors of a living cell as a sample;*

*a computer configured to determine image-pickup timings for picking up images of the living cell, based on timings of the periodic behaviors of the living cell;*

*a scanner which picks up only images of instantaneous statuses in the periodic behaviors of the living cell at specific timings, in synchronism with the determined image-pickup timings; and*

*a processor configured to acquire a still picture of the instantaneous statuses of the living cell by accumulating or averaging the picked-up images.*

* * * * *